June 23, 1964 R. E. BAETKE 3,138,354
AILERON CONTROL ON VARIABLE SWEEP WING DESIGNS
Filed Aug. 2, 1962 8 Sheets-Sheet 1

Fig. 1.

INVENTOR.
RUSSELL E. BAETKE
BY
Reynolds + Christensen
ATTORNEYS

June 23, 1964 R. E. BAETKE 3,138,354
AILERON CONTROL ON VARIABLE SWEEP WING DESIGNS
Filed Aug. 2, 1962 8 Sheets-Sheet 8

INVENTOR.
RUSSELL E. BAETKE
BY
Reynolds + Christenson
ATTORNEYS

United States Patent Office 3,138,354
Patented June 23, 1964

3,138,354
AILERON CONTROL ON VARIABLE SWEEP WING DESIGNS
Russell E. Baetke, Seattle, Wash., assignor to The Boeing Company, Seattle, Wash., a corporation of Delaware
Filed Aug. 2, 1962, Ser. No. 214,352
10 Claims. (Cl. 244—90)

This invention relates to a drive mechanism for transferring a control function into a hinged airfoil on the fuselage of an aircraft (including its tail structure). In particular the invention is concerned with controlling the ailerons on a variable sweep wing design.

In such a case, there is the problem that the motion of the wings introduces an error into the control function due to the fact that the inboard components of the drive mechanism are fixed relative to the fuselage whereas those outboard on the wings are moving with the wings in relation to the fuselage. Unless the error is removed, the ailerons will experience an output which, of course, was not called for in the pilot input.

It is a principal object of the present invention to provide a drive mechanism of the type described which enables a control function to be transferred into a hinged airfoil on the fuselage of an aircraft without the motion of the airfoil affecting the relationship between input and output.

Another object is directed to providing a drive mechanism of this type enables a rotatable signal transmitter member placed at the airfoil pivot joint to rotate in relation to the airfoil at a rate due only to the pilot input.

A further object of the invention is directed to providing a mechanism of this type in which the primary inboard components are susceptible to location in an area remote from the airfoil pivot joint, and particularly one which is conveniently accessible to maintenance workers and can accommodate the components without congestion and/or added structural support. A related object is to provide a mechanism of this type which requires fewer and smaller components in the critical region of the joint and gives little cause for binding. Still others call for a mechanism of this type which can be used to drive corresponding control surfaces on opposite sides of the fuselage from a central control point in the latter, which point gives the surfaces a direct mechanical tie that is independent of the motion of their airfoils.

Another aspect of the invention recognizes that in most variable sweep wing designs it is necessary that any drive mechanism for relatively movable control surfaces on the wing members must have the capability of centering and locking the control surfaces automatically when the wing members are swept back into their rearmost and so-called "wings in" position. In such a position ailerons and other lift control surfaces become ineffective because air flow over the wings is substantially parallel to the hinge axis of the control surfaces. Consequently, it is another important object of the invention to provide a mechanism of the type described which can be embodied in a single compact control system having means capable of accomplishing this. Such a means may be referred to as a "fader device." A fader device which is particularly suited to use in combination with the drive mechanism of the present invention is shown and described in U.S. Patent 2,936,968, although it will be recognized that other such devices can be employed in its place.

These and other objects are realized according to the invention in a continuous drive mechanism of my conception and of the type described which delivers the pilot input to a rotatable signal transmitter member at the airfoil pivot joint in a form which, on the occasion of a change in the airfoil's position, is suitably modified by an additional input which is equal but opposite to the error input generated in the drive components outboard on the airfoil. As a consequence, the rotation of the transmitter member reflects nothing of the motion of the airfoil. Where, for example, there is no pilot input, the transmitter member rotates at the same rate as the airfoil. Where there is a simultaneous pilot input, the transmitter member is caused to rotate in relation to the airfoil at a rate due only to the pilot input.

For convenience in distinguishing it from the "pilot input" and the airfoil's "error input," I shall hereafter refer to this additional input as the "compensating input." This compensating input may be similar or opposite in direction to the pilot input depending on the direction of the error input. The error input is, of course, a function of the angle swept by the airfoil.

The transmitter member is one of a pair of rotatable members which are connected in series with the surface on the airfoil to be driven. The other member has its axis of rotation on the aircraft fuselage and acts to receive the pilot input. The pilot and compensating inputs are mixed or combined, and delivered to the transmitter member, in a so-called differential mixer device in the connection between the members. The mixer device is connected with the airfoil and responsive to rotation of both the receiver member and the airfoil to cause the transmitter member to rotate in relation to the airfoil at a rate equal to the pilot input in the input-output ratio of the members. Broadly speaking, the differential mixer device includes three relatively articulated members which are pivotally interconnected with each of the receiver, transmitter and airfoil. In preferred constructions such as illustrated hereafter, the mixer device takes the form of a relatively articulated linkage including a differential link which is pivotally interconnected with the transmitter at a point thereon and a pair of intermediate links which are each pivotally interconnected at one end with the differential link by floating pivots lying on opposite sides of the aforementioned point and at the other end with one of the receiver and the airfoil.

Reference should be made to the accompanying drawings for one of these constructions which is illustrated in a presently preferred form serving to drive the ailerons on the wings of a variable sweep wing design. The drive mechanism also includes a fader device which is integrated with the other inboard components in a highly compact arrangement. Understandably the drive mechanism need not include a fader device in all cases, nor the particular device illustrated. It will also be evident that certain expedients such as dials to indicate aileron and wing travel, have been employed for purposes of clarity and simplification in the drawings.

FIGURES 3–8 illustrate various positions of the integrated arrangement in plan view, using conveniently a pair of dials to indicate deflection of the ailerons on one hand and angular movement or positioning of the variable sweep wing members on the other;

FIGURES 3a–8a being a general representation of the relative positioning of the ailerons as seen through the left-hand aileron, it being remembered that the right-hand aileron travels in the opposite direction;

FIGURE 3 being a plan view of the arrangement when both the wing members and the ailerons (FIGURE 3a) are in neutral position;

FIGURE 4 being a plan view of the arrangement when the ailerons (FIGURE 4a) have undergone a 20 degree counterclockwise deflection, as seen from the aircraft, while the wing members remained neutral;

FIGURE 5 being a plan view of the arrangement when the ailerons (FIGURE 5a) have undergone a 20 degree clockwise deflection, as seen from the aircraft, while the wing members remained neutral;

FIGURE 6 being a plan view of the arrangement when the wing members have undergone a 30 degree rearward sweep while the ailerons (FIGURE 6a) remained neutral;

FIGURE 7 being a plan view of the arrangement when the wing members have undergone a 30 degree rearward sweep after a 20 degree counterclockwise deflection of the ailerons (FIGURE 7a); and FIGURE 8 being a plan view of the arrangement after the wing members have undergone an additional 20 degree sweep and have entered the fader portion of their angular path to an extent that aileron travel (FIGURE 8a) has been reduced to zero deflection or centered.

Figure 1:
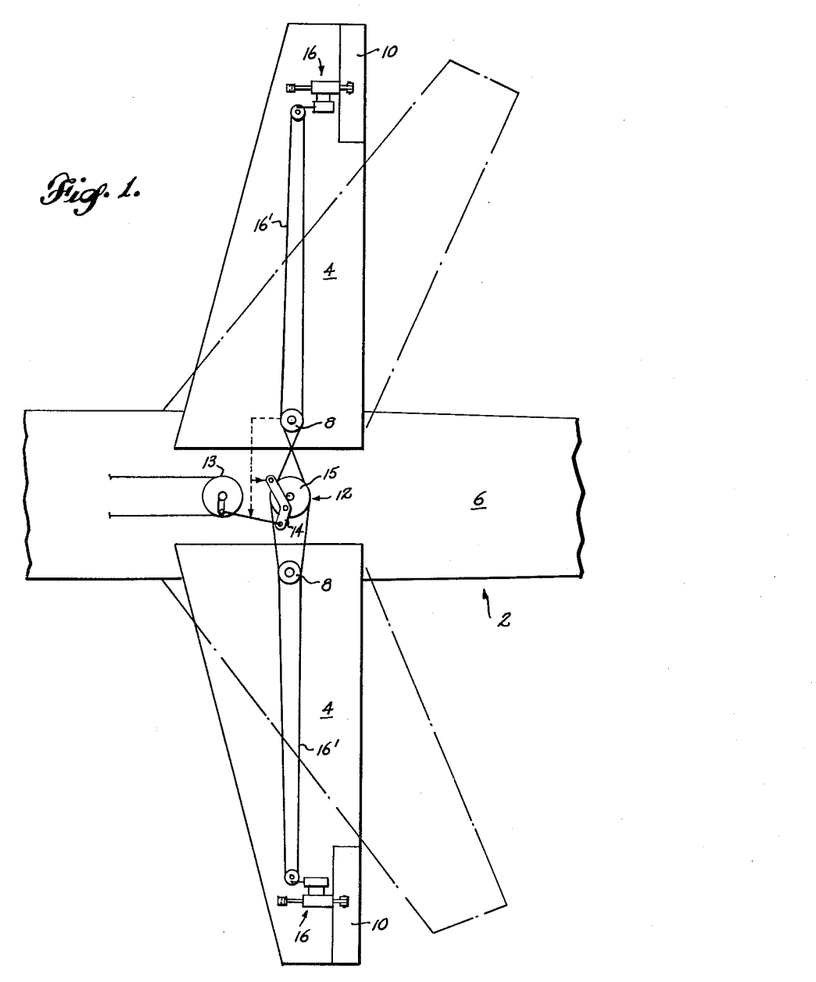
FIGURE 1 in these drawings shows a general scheme by which the integrated arrangement can be built into the aircraft.

Referring to FIGURE 1, an aircraft 2 is equipped with variable sweep wing members 4 each mounted on the aircraft fuselage 6 for pivotal movement about joints 8. Control surfaces or ailerons 10 on the wing members 4 are movable relative to the wing members in counterdirectional deflections about a spanwise axis, i.e. one extending substantially lengthwise of the wing members. Deflection of the ailerons 10 is actuated or controlled through a continuous drive mechanism indicated generally at 12 and including a receiver drum 13 for the pilot signal, a differential mixer device 14, and a control drum 15. Control is directly effected in a wing mounted mechanism 16 forming no part of the invention but receiving the input signal from the control drum 15 through transmitter drums 30 on the pivot joints 8 and a cable connection 16' in each of the wing members.

Figure 2:
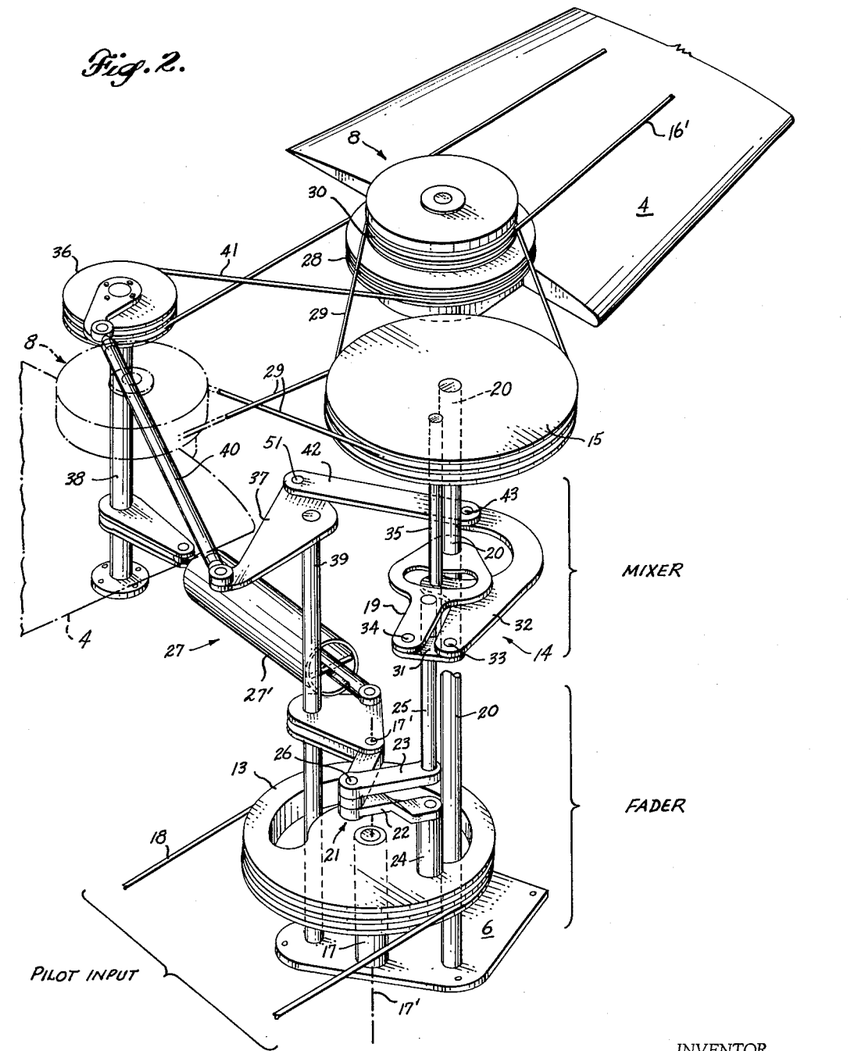
FIGURE 2 depicts the integrated arrangement in partially exploded form.

The drive mechanism 12 is seen in perspective in FIGURE 2. The receiver drum 13 appears in the lower half of the view, while the control drum 15 appears in the upper half. The differential mixer device which forms so important a part of the present invention, appears between the two, together with a fader device of the character described in the aforementioned patent. Both are connected with one of the pivot joints 8 through sensory means appearing in the left-hand rear perspective of the view.

The fader device in this integrated arrangement is comparable per se to the device described and shown in U.S. Patent 2,936,968. As such, it includes a signal receiver such as that seen at 13. In the present case, this receiver is in the form of a drum mounted on a fixed pivot 17 on the aircraft fuselage 6 for rotation in response to a pilot signal in the cable connection 18 from the pilot controls (not shown). The pilot signal is transmitted through the fader device to a swing arm 19 mounted for angular movement about a second fixed pivot 20 on the aircraft fuselage 6 and which serves at once as the fader signal transmitter and the signal receiver for the mixer device.

Transmission of the pilot signal through the fader device is effected, in short, by an articulated crank connection between the receiver drum 13 and the swing arm 19. The crank connection is indicated generally at 21 and comprises a pair of crank arms 22 and 23 having corresponding end portions pivotally connected with the receiver drum 13 on one hand and the swing arm 19 on the other, through pivot joints 24 and 25, respectively. The other end portions of the arms 22, 23 are pivotally interconnected through a pivot joint 26 whose axis is spaced from the axes of each of the pivot joints 24, 25 by the radius of the axis of the pivot joint 24 about the axis of the fixed pivot 17. These relationships enable the pivot joint 26 to be swung into and out of concentricity with the fixed pivot 17 such that when out of concentricity with the fixed pivot, the crank connection operates to transmit the pilot signal to the swing arm 19 at an input-output ratio that varies with the radial offset of the pivot joint 26 from the fixed pivot 17; and when in concentricity with the fixed pivot 17, the crank connection becomes inoperable to transmit the pilot signal and accordingly no signal reaches the swing arm 19.

Movement of the pivot joint 26 into and out of concentricity with the fixed pivot 17 is effected through sensory means indicated generally at 27 and pivotally interconnecting the pivot joint 26 with a drum 28 fixed on the wing member 4. This sensory means includes a conventional spring take-up device 27 that undergoes a certain amount of lost motion in the initial stages of its operation so that movement of the pivot joint 26 is effected only during angular movement of the wing members 4 into or out of their rearmost or "wings in" position. For purposes of the present disclosure, therefore, it is significant only that the pilot signal will reach the swing arm 19 at all times when the ailerons are not centered and locked in, that is, when the pivot joint 26 is disposed out of concentric relation with the fixed pivot 17.

The signal received in the pivot joint 25 and the swing arm 19, is transferred to the control drum 15 by a mixer linkage that will be described shortly. Firstly, however, it should be mentioned that the control drum 15 is mounted for rotation about a fixed pivot, in this instance seen at 20 on the aircraft fuselage 6, and relays the signal through a cable connection 29 to each of the pair of transmitter drums 30 rotatably mounted on the hinge axes of the wing members 4. From the drums 30, the output signal reaches the mechanism 16 in each of the wing members through the cable connection 16' shown in FIGURE 1.

The mixer linkage comprises three links 31, 32, and 42 which are relatively articulated about floating pivots 33 and 43 and pivotally interconnected with each of the swing arm 19, the drum 15, and the drum 28 so as to be responsive both to the motion of arm 19 and the motion of wing 4. Mixing of their inputs is effected in a differential link 32 which is sized and shaped for this purpose and pivotally interconnected with the drum 15 at pivot 35. The pilot input in arm 19 is sensed in link 31 by virtue of a pivotal interconnection between the arm and link at pivot 34. The wing's compensating input is fed into link 42, on the occasion of a change in its position, by virtue of a pivotal interconnection between the link 42 and the drum 28 as comprised by a drum 36 on fuselage pivot 38, a cable connection 41 between drums 36 and 28, a swing arm 37 on fuselage pivot 39, a rod connection 40 between the drum 36 and arm 37, and a pivot joint between the arm 37 and link 42 at 51.

A single rod may replace the elements 40, 37 and 42, if desired.

The operation of the mechanism will be better understood with reference to FIGURES 3-8 where several conditions of pilot input to the ailerons and wing sweep are shown on a pair of dials A and B. Pivotal movement of the wing members 4 is generated by apparatus that forms no part of the present invention and accordingly is not shown. This apparatus can or may be conventional in every respect.

Figures 3, 3A:
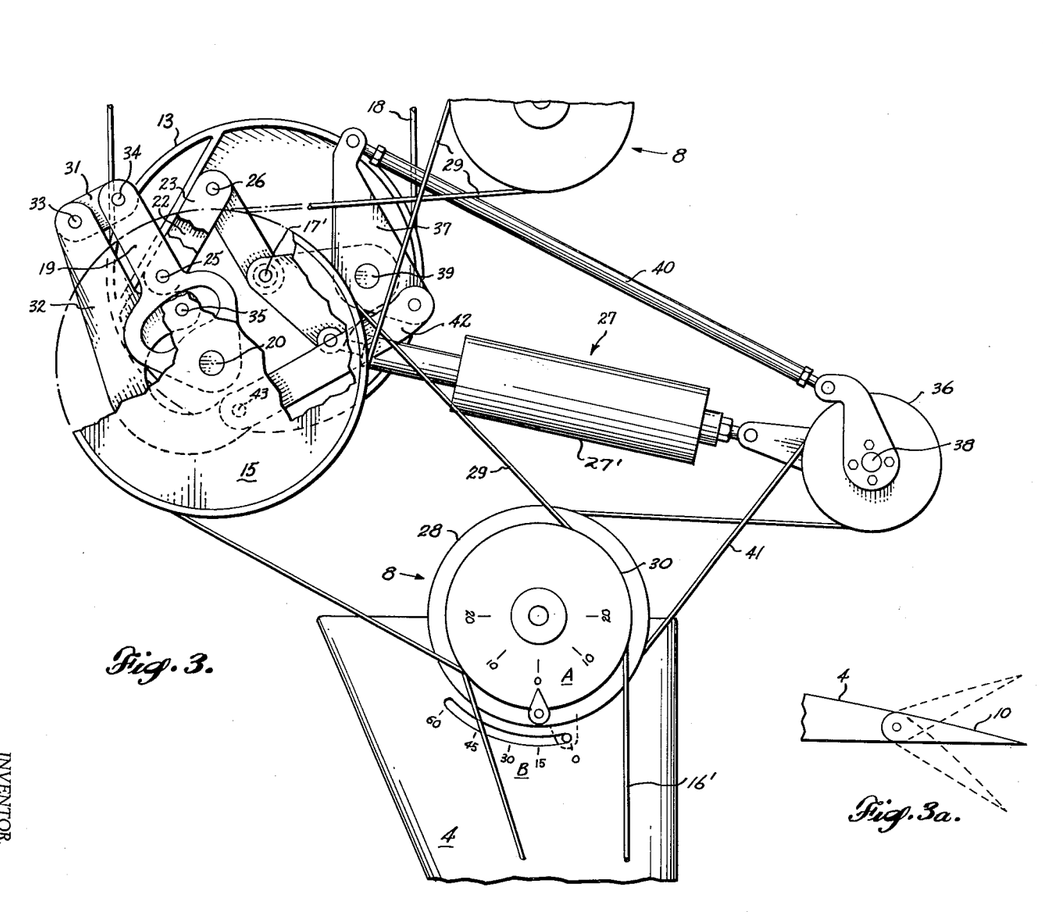

FIGURE 3 shows the drive mechanism when both the wing members and the ailerons are in neutral position. The pivot joint 26 lies offset from the axis 17' of the fixed pivot 17 and accordingly the fader crank connection 21 will transmit any signal received in the drum 13 to the pivot joint 25. No signal has been given to the drum 13, however, and in accord with this the dial A indicates a zero deflection of the ailerons. Similarly, the wing members 4 have been given no rearward sweep and the dial B indicates zero deflection in the case of them. The ailerons, the wing members, and the actuator mechanism are quiescent in all respects.

Figures 4, 4A:
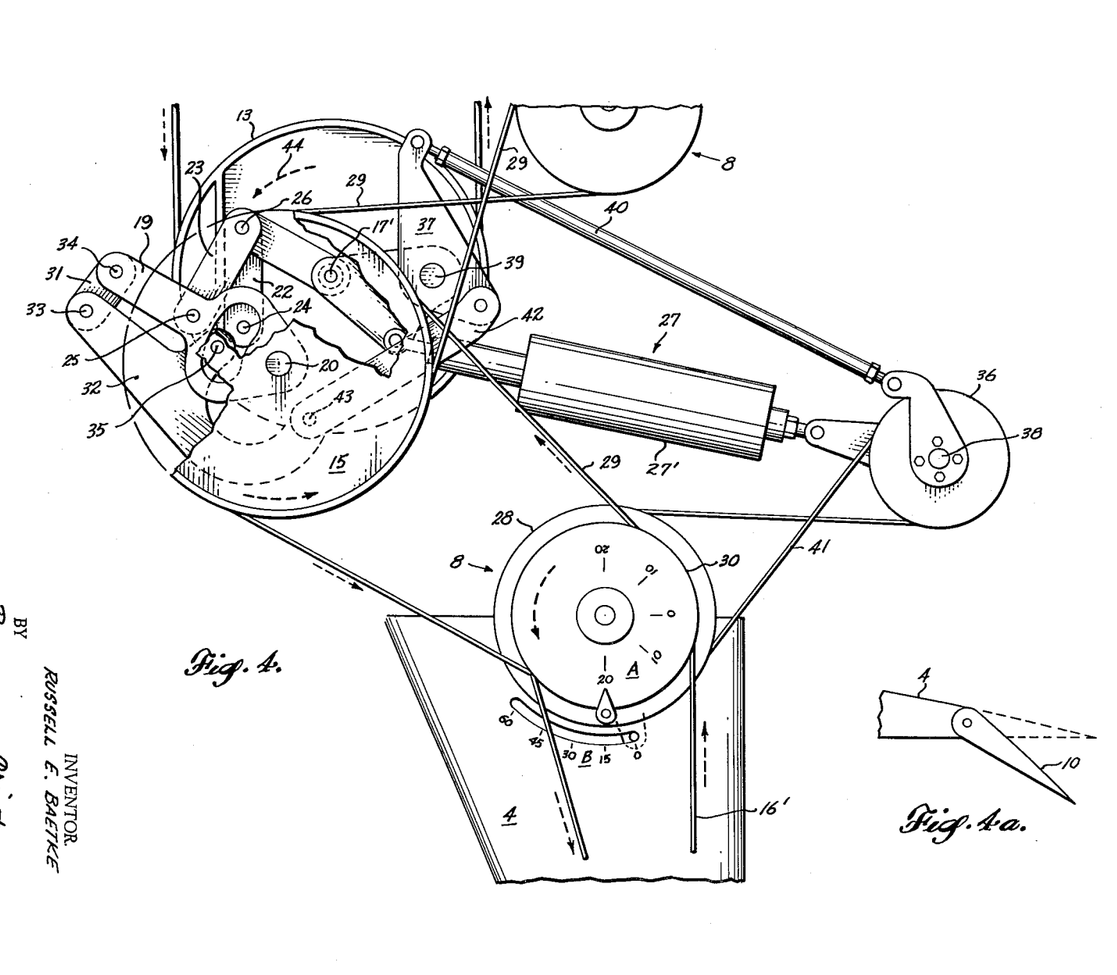

In FIGURE 4 the drive mechanism is shown after the ailerons have undergone a 20 degree counterclockwise deflection, as seen from the aircraft, while the wing members remained in the neutral or forward sweep position. This deflection was caused by counterclockwise movement of the drum 13 in accord with arrow 44. The signal generated in and transmitted through the fader transmission 21 caused counterclockwise rotation of the pivot joint 25 and therefore the swing arm 19, about the fixed pivot 20. This angular movement of the swing arm 19 in turn generated a signal in the linkage 31, 32, 42, which, because of the restraint exercised on pivot joint 51 by the swing arm 37, underwent a swiveling action relative to pivot 51 resulting in a counterclockwise angular movement of the pivot joint 35 and thus the drum 15, in accord with the input-output relationship built into the mechanism.

Figures 5, 5A:
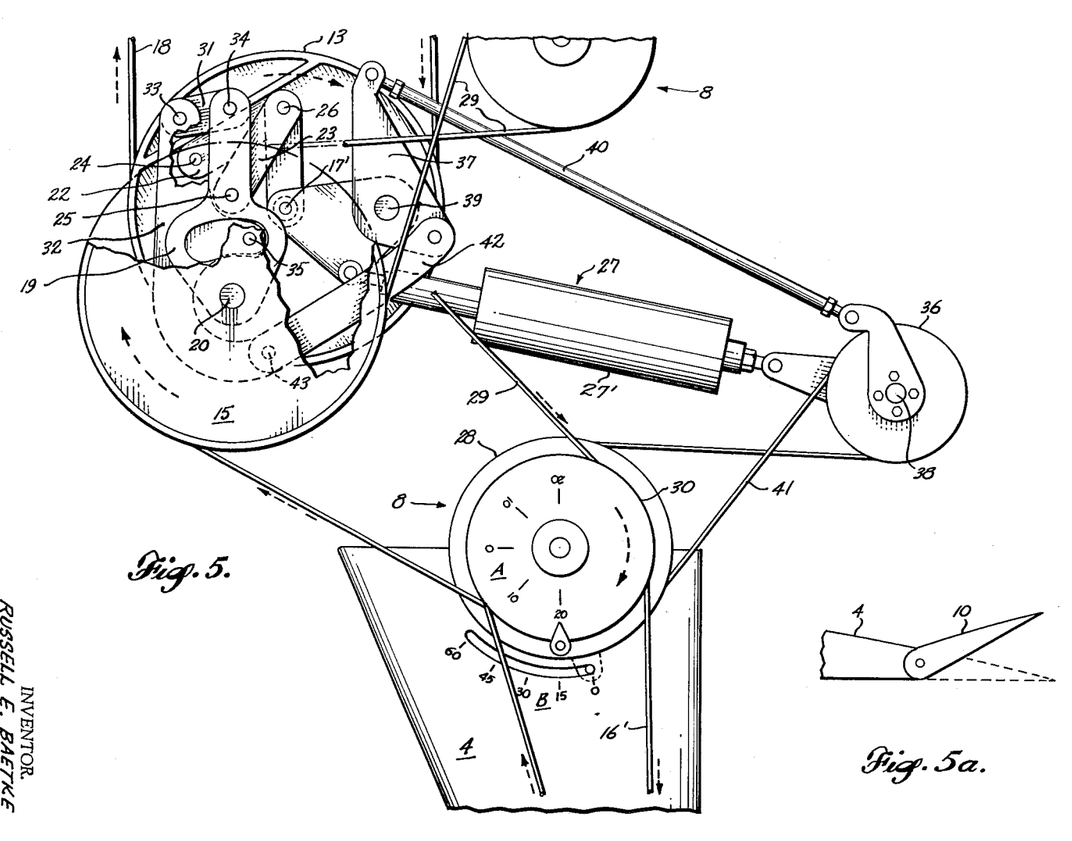

In FIGURE 5, the ailerons have undergone an equivalent but opposite deflection.

Figures 6, 6A:
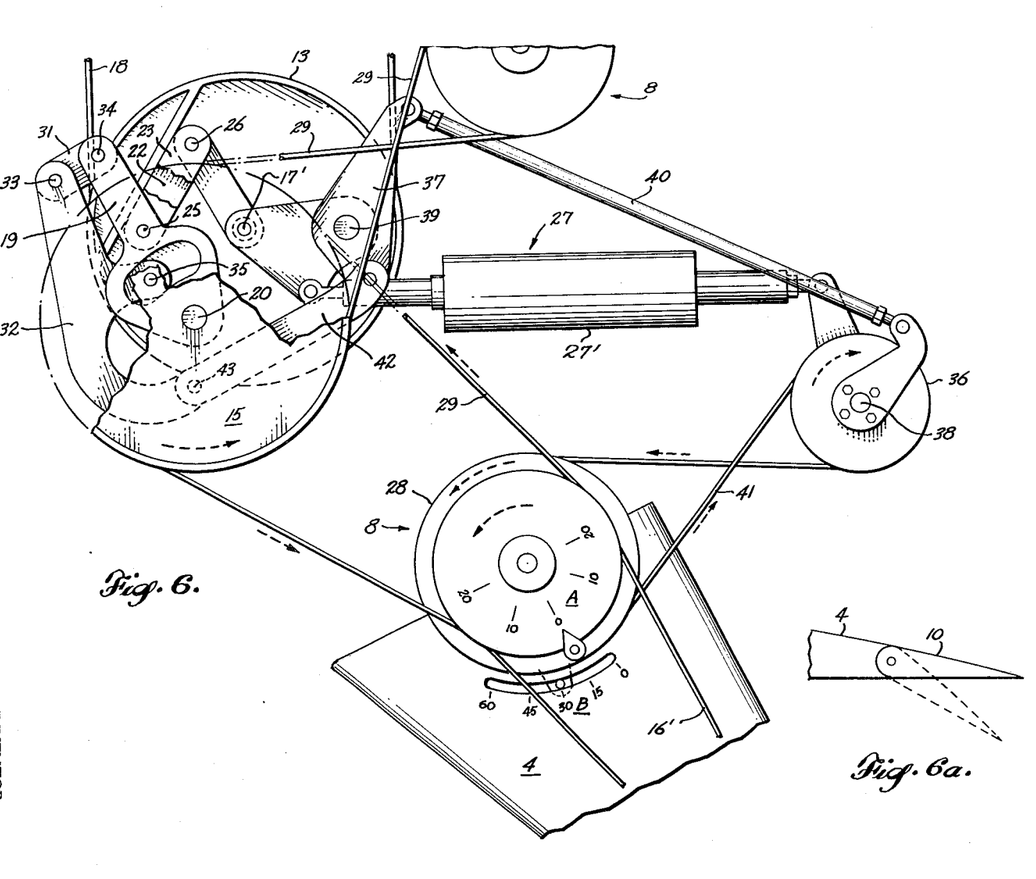

In FIGURE 6 the drive mechanism registers no pilot signal for the ailerons, as indicated on dial A, but the fader device and the mixer device have been excited by pivotal movement of the wing members 4 through a 30 degree angle. The signal in the fader sensory means 27 has been taken up, however, by relaxation of the spring (not shown) in the device 27'.

Angular movement of the fixed drum 28 with the wing member 4 generated a corresponding movement in the drum 36 and a chain reaction in the rod connection 40 and swing arm 37. Since the pivot joint 34 is now constrained against movement by reaction in the pilot controls, the signal generated at pivot joint 51 caused a swiveling movement in the linkage 31, 32, 42 which in this case was relative to the pivot joint 34. This swiveling action produced a rotational component at the pivot joint 35 about the axis of pivot 20, with the result that a signal was generated in the drum 15. Because of the arrangement, this signal was opposite to the error signal generated in cables 16' and drums 30 by the change in position of the wings 4. Also the diameter of drum 15 bears such a relationship to that of drums 30 that the signal rotated the drums 30 at the same velocity as the wing members 4.

Figures 7, 7A:
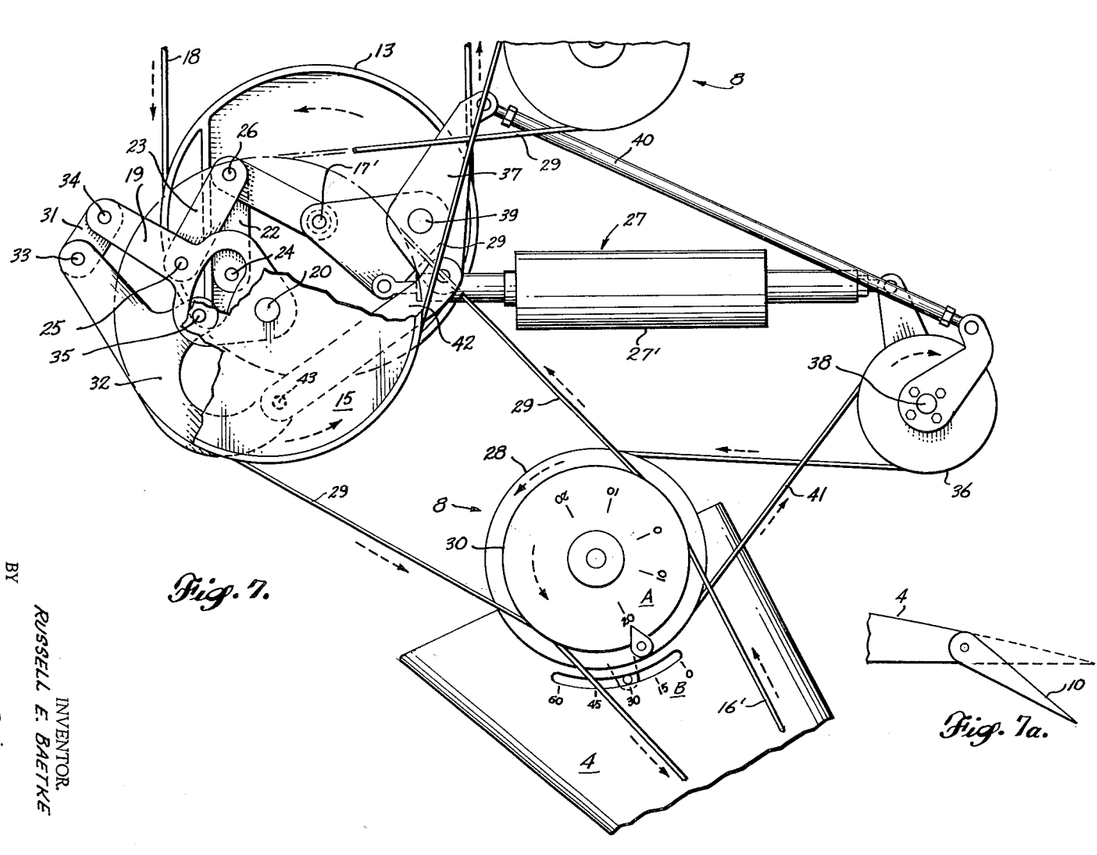

The relationships in FIGURE 7 reflect a combination of the 20 degree counterclockwise aileron deflection of FIGURE 4 and the 30 degree wing sweep of FIGURE 6. Note in FIGURES 4 and 6 that each deflection caused a counterclockwise rotation of the drum 15. In FIGURE 7, the effect of a signal at pivot joint 34 corresponding to that of FIGURE 4 and a simultaneous signal at pivot joint 51 corresponding to that of FIGURE 6, was to provide a moment at pivot joint 35 consisting of the aggregate of the individual rotational components generated by each signal. Consequently, drum 15 not only carries a signal representing the desired 20 degree deflection but also one that takes wing position into account. Where the ailerons are given an opposite or clockwise deflection, the signals in pivot joints 34 and 51, and thus the rotational components at pivot joint 35 will in part cancel one another so that the cable connection is given a signal commensurate with the pilot's intentions.

Figures 8, 8A:
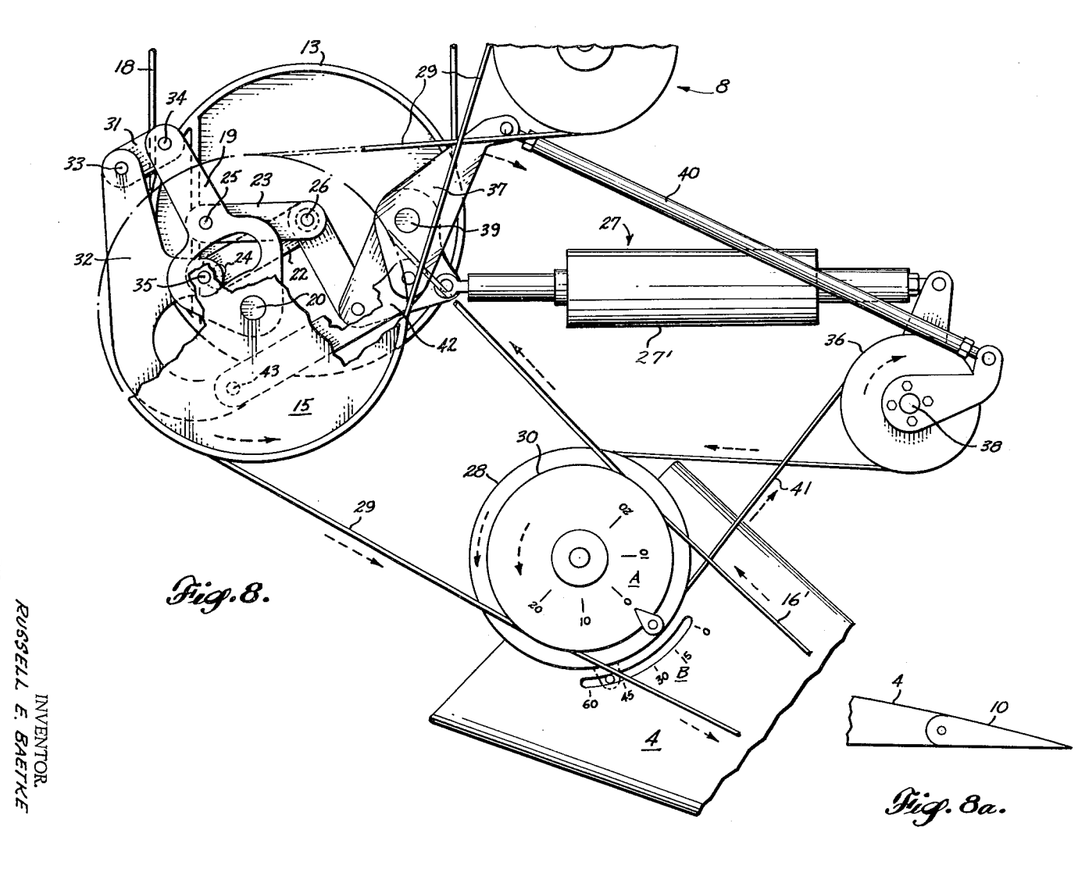

In FIGURE 8 the mechanism is under the control of the fader device as the wing members have undergone an additional 20 degree sweep over that of FIGURE 7. This additional sweep took each wing member into a rearward portion of its angular path in which the spring take-up 27' was expended and the fader sensory means 27 was activated to move the pivot joint 26 into concentricity with the pivot 17 with the result that the input-output ratio descended to a zero value. This is pointed up by the fact that the swing arm 19 has resumed the neutral position of FIGURE 3. Accordingly, there is no signal in the pivot joint 34. There is, however, a signal in the pivot joint 51 reflecting the 50 degree deflection of the wing members. The swiveling movement generated in the linkage 31, 32, 42 by this signal gave rise to sufficient a signal in the pivot joint 35 to compensate for the wing position, whereby the ailerons could be centered despite the extreme rearward position of the wing members.

Moreover, because of the free wheeling action that the fader link 22 now experiences about the pivot joint 26, the ailerons will remain in centered position, guarded against any signal from the pilot. The signal receiver 13, as shown in FIGURE 8, in fact carries a 20 degree input retained from the pilot signal delivered to it for the aileron deflection of FIGURE 7. Note in this connection the position of pivot joint 24 relative to its position in FIGURE 3.

It will be apparent that the necessary arithmetic relationship between the pivot movement of the hinged wing members and the compensating function incorporated into the output signal will vary with each application of the invention. This relationship can or may be determined in conventional fashion either arithmetically or empirically.

Although the invention has been described in considerable detail with reference to a preferred embodiment thereof, it is to be understood that certain additions and modifications can be made in connection therewith, without departing from the spirit and scope of the invention as defined in the following claims.

I claim as my invention:

1. In combination, an aircraft fuselage, a hinged airfoil thereon, a relatively movable control surface on the air-foil, and a continuous drive mechanism for the control surface comprising a pair of rotatable members having a predetermined input-output ratio and connected in series with the control surface to drive the same, one of which members has its axis of rotation on the fuselage and acts to receive the pilot input signal, and the other of which members has its axis of rotation coincident with the hinge axis of the airfoil and acts to transmit the signal into the airfoil, the connection between the members including a differential mixer device which is connected with the airfoil and responsive to rotation of both the signal receiver member and the airfoil to cause the signal transmitter member to rotate in relation to the airfoil at a rate equal in said ratio to the pilot input.

2. The combination according to claim 1, wherein the differential mixer device includes three relatively articulated members which are pivotally interconnected with each of the signal receiver and transmitter members and the airfoil.

3. The combination according to claim 1, wherein the differential mixer device includes a relatively articulated linkage which is pivotally interconnected with each of the signal receiver and transmitter members and the airfoil.

4. The combination according to claim 3, wherein the linkage includes a differential link which is pivotally interconnected with the signal transmitter member at a point thereon, and a pair of intermediate links which are each pivotally interconnected at one end with the differential link by floating pivots lying on opposite sides of the aforementioned point, and at the other end with one of the signal receiver members and the airfoil.

5. The combination according to claim 4, wherein the pivotal interconnection between the differential link and the signal transmitter member includes a rotatable drum which is located remotely from the hinge axis of the airfoil.

6. The combination according to claim 5, wherein the airfoil is one of a pair of such airfoils on opposite sides of the fuselage and the drum is connected in series with each of a pair of signal transmitter members having their axes of rotation coincident with the hinge axes of the airfoils.

7. The combination according to claim 6, wherein the airfoils constitute the wings of the aircraft.

8. The combination according to claim 1, wherein the drive mechanism also includes a fader device which is connected in series with the members and the control surface.

9. The combination according to claim 1, wherein the axes of the members are parallel to one another.

10. In combination, an aircraft fuselage, a hinged airfoil thereon, a relatively movable control surface on the airfoil, and a continuous drive mechanism for the control surface comprising a pair of rotatable members having a predetermined input-output ratio and connected in series with the control surface to drive the same, one of which members has its axis of rotation on the fuselage and acts to receive the pilot input signal, and the other of which members has its axis of rotation coincident with the hinge axis of the airfoil and acts to transmit the signal into the airfoil, the connection between the members including a differential mixer device which is responsive to rotation of both the signal receiver member and the airfoil to cause the signal transmitter member to rotate in relation to the airfoil at a rate equal in said ratio to the pilot input.

References Cited in the file of this patent

UNITED STATES PATENTS

| | | |
|---|---|---|
| 2,573,044 | Morris | Oct. 30, 1951 |
| 2,669,401 | Bosserman | Feb. 16, 1954 |
| 2,788,182 | Brenden et al. | Apr. 9, 1957 |

FOREIGN PATENTS

| | | |
|---|---|---|
| 280,406 | Great Britain | Nov. 17, 1927 |